Dec. 2, 1969  TADAMICHI MORI ET AL  3,481,258
AUTOMATIC EXPOSURE CAMERA
Filed June 21, 1965  3 Sheets-Sheet 1
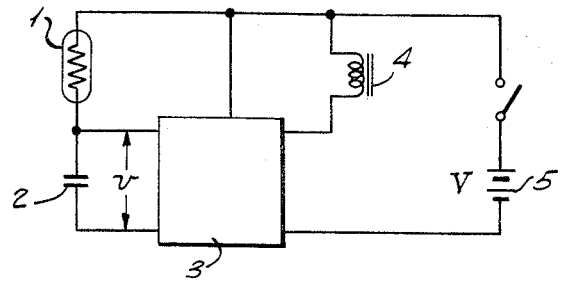
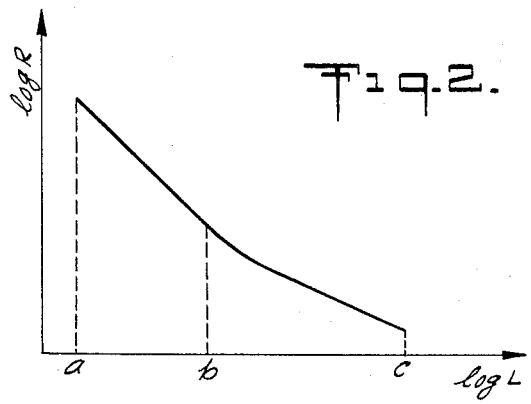
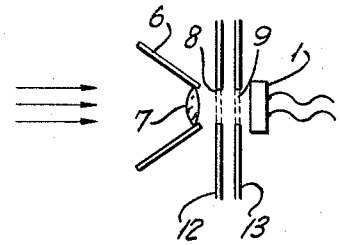 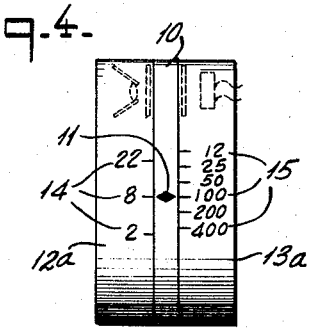
INVENTORS
TADAMICHI MORI
YOSHIHIKO YANAGAWA
NAOMICHI SUZUKI
Stanley Wolder
ATTORNEY Dec. 2, 1969   TADAMICHI MORI ET AL   3,481,258
AUTOMATIC EXPOSURE CAMERA Filed June 21, 1965   3 Sheets-Sheet 2

INVENTORS
TADAMICHI MORI
YOSHIHIKO YANAGAWA
BY NAOMICHI SUZUKI

Stanley Walder

ATTORNEY

Dec. 2, 1969　　　TADAMICHI MORI ET AL　　　3,481,258
AUTOMATIC EXPOSURE CAMERA
Filed June 21, 1965　　　　　　　　　　　　　　3 Sheets-Sheet 3
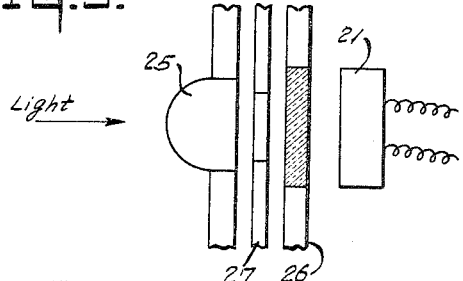
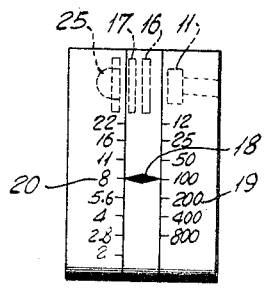
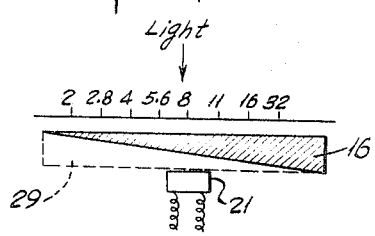
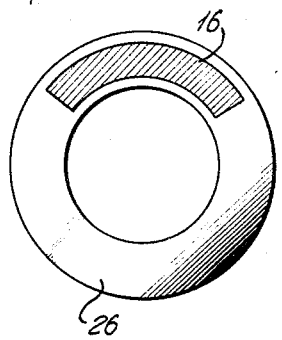
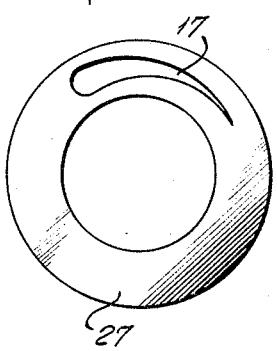
INVENTORS
TADAMICHI MORI
YOSHIHIKO YANAGAWA
NAOMICHI SUZUKI
Stanley Walder
ATTORNEY United States Patent Office 3,481,258
Patented Dec. 2, 1969

3,481,258
AUTOMATIC EXPOSURE CAMERA
Tadamichi Mori, Tokyo-to, Yoshihiko Yanagawa, Tokorozawa-shi, and Naomichi Suzuki, Tokyo-to, Japan, assignors to Citizen Tokei Kabushiki Kaisha, Tokyo-to, Japan, a corporation of Japan
Filed June 21, 1965, Ser. No. 465,632
Claims priority, application Japan, June 20, 1964 (utility model), 39/48,668; Aug. 19, 1964 (utility model), 39/64,952
Int. Cl. G01j 1/00, 1/52; G03b 9/02
U.S. Cl. 95—10      9 Claims

ABSTRACT OF THE DISCLOSURE

In an automatic camera having a shutter timing network including a photoconductor exposed to the incident light, a variable aperture light attenuating member and a variable density light attenuating member are positioned in tandem in front of the photoconductor. One of the members is coupled to and concurrently adjustable with the camera objective diaphragm and the other member is adjustable in accordance with the film speed. The percentage of light transmission of the light attenuating members is substantially equal to the product of the percentages of transmission of the individual members to obviate any compensating electronic adjustment of the timing network and to employ the photoconductor within its linear range.

---

The present invention relates generally to improvements in cameras and it relates more particularly to an improved camera provided with means for automatically controlling the exposure thereof in accordance with the ambient light conditions.

A principal object of the present invention is to provide an improved automatic exposure camera.

Another object of the present invention is to provide an improved camera having means for automatically controlling the shutter speed in accordance with the amount of incident light and the size of the aperture of the camera lens diaphragm.

Still another object of the present invention is to provide an improved automatic camera shutter mechanism which is regulated in accordance with the incident light, the size of the main lens diaphragm aperture and the speed of the film employed.

A further object of the present invention is to provide an automatic camera of the above nature characterized by its simplicity, ruggedness, reliability and versatility.

The above and other objects of the present invention will become apparent from a reading of the following description taken in conjunction with the accompanying drawings, wherein:

FIGURE 1 is a schematic diagram of the shutter control network of a camera embodying the present invention;

FIGURE 2 is a log-log graph illustrating the relationship of the resistance of the photoconductor to the value of the light incident thereon;

FIGURE 3 is a fragmentary side view of the adjustable light sensing system of the improved camera;

FIGURE 4 is a side view of the assembled light sensing system of FIGURE 3 and the related control rings;

FIGURE 9 is an enlarged fragmentary side view of another form of light sensing system embodying the present invention;

FIGURE 10 is a side view of the assembled light sensing system of FIGURE 9 and the related control rings;

FIGURE 11 is a plan view of one of the light absorbing elements of the light sensing system of FIGURE 10;

FIGURE 12 is a developed plan view of the filter member of the elements of FIGURE 11 and the associated control ring; and FIGURE 13 is a plan view of the other light absorbing element employed in the sensing system of FIGURE 10.

Figure 5:
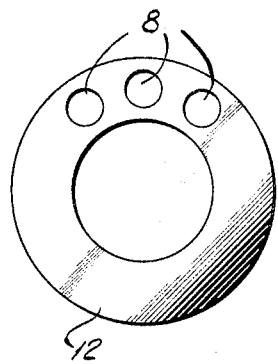
FIGURES 5 through 8 are plan views of light absorbing elements employed in the improved light sensing system.

In the conventional automatic exposure camera, the exposure is controlled mechanically by the use of a photoelectric element and an ammeter. To improve the accuracy, the durability and the stability of the automatic exposure control, there has been proposed an electronically operated automatic exposure control system as shown in FIG. 1. This system includes an integrating circuit comprising a photoconductive element 1 directed to the object to be photographed and a timing capacitor 2 of suitable capacitance connected in series through a switch to a voltage source 5. When the output voltage of the capacitor 2 reaches a predetermined value, a switching circuit 3 which responds to the capacitor voltage is actuated to actuate an electromagnet 4, thereby effecting the automatic control of the shutter exposure time and obtaining a proper exposure, the switch being closed with the opening of the shutter and the electromagnet 4 effecting the closing of the shutter when the capacitor 2 reaches a switch triggering voltage.

The time T (second) which elapses from the application of the power source voltage to the actuation of the switching circuit is given by the following formula:

$$T = R.C. \ln\left(\frac{V}{V-v}\right)$$

where R (ohms) is the resistance value of the photoconductive element 1, C (farads) is the capacitance of the capacitance of the capacitor 2, $v$ (volt) is the trigger voltage of the switching circuit 3, and V (volts) is the voltage of the power source 5.

For obtaining a proper exposure, it is necessary that the exposure time T is in inverse proportion to the object brightness B. Accordingly, it is desirable that the resistance value R of the photoconductive element 1 is in inverse proportion to the object brightness B, namely the illumination L of the surface of the photoconductive element.

Now, generally, the resistance value R of the photoconductive element 1 does not vary linearly with respect to wide illumination range. For example, in the case of cadmium sulfide, as shown by the graph of FIG. 2 wherein the horizontal coordinate is the logarithm of the illumination L and the vertical coordinate is the logarithm of the resistance value R, within a low illumination range $a$–$b$, a comparatively good linearity is obtained, the resistance value R being approximately in inverse proportion to the illumination L.

Accordingly, when the object brightness is so high that the illumination L of the photoconductive element 1 directed to the object exceeds the inverse proportion limit $b$, the light rays incident on the photoconductive element 1 may be restricted by a filter, a diaphragm, etc. Such operation alone, however, would cause the effect of too long exposure time. Accordingly, in this case it is necessary that the diaphragm aperture of the camera objective be also stopped down in the same proportion. The arrangement of the present invention employs such a system.

When the object brightness is held constant and the diaphragm aperture of the camera objective is varied in the range of, for example, $f2$ to $f22$, the pencil of light rays incident on the film is independent of the shutter exposure time and varies with the diaphragm aperture within the range of $2^7$ times. Then, when the diaphragm value is held constant and the shutter exposure time is varied within the range of $\frac{1}{2}$ sec. to $\frac{1}{500}$ sec., the pencil of light rays incident on the film is held constant but the incident light amount varies within the range of $2^8$ times. Accordingly, by combining the diaphragm aperture and the exposure time, the light amount incident on the film varies within the range of $2^{15}$ times, that is, photographing operation can be made within the object brightness variation range of $2^{15}$ times.

In the arrangement of the present invention, the stopping down of the diaphragm of the camera objective causes a proportional decrease of the amount of light incident on the photoconductive element 1 so that the amount of the light incident on the photoconductive element 1 is always kept in proportion to the amount of light incident on the film.

Generally speaking, when the object brightness varies, under proper exposure conditions it is necessary that the film surface brightness varies in inverse proportion to the shutter exposure time. Since the exposure time variation range is $2^8$ times, the film surface illumination variation range is $2^8$ times, and accordingly, the illumination variation range of the surface of the photoconductive element 1 is also $2^8$ times. This value of the range is narrower than the photographable object brightness variation range value, namely $2^{15}$ times, by the diaphragm aperture variation range value, namely $2^7$ times.

However, when the object is excessively bright, the photographing is made with the diaphragm stopped down, so that the photoconductive element 1 is not used in high ilumination range, that is, it is advantageously used with the illumination variation range $a$–$c$ of FIG. 2 practically held down to the range $a$–$b$ of the same figure.

When the film sensitivity index is changed, the necessary compensation according to the present invention is accomplished by adjusting the amount of light incident on the photoconductive element 1. Various systems are considered for such adjustment because a similar light adjustment is made also by an arrangement coupled to the camera objective diaphragm, as mentioned above.

Thus, in a sense the present invention contemplates the provision of an automatic exposure camera comprising a photosensitive element, an automatic exposure mechanism responsive to said photosensitive element, and a pair of independently adjustable variable light absorbing elements disposed in the path of light to said photosensitive element, the percentage of light transmission of said pair of elements along said light path being related to the product of the percentages of the light transmission of the individual elements along said light path.

Referring now to FIGURES 3 to 8 of the drawings which illustrate a preferred embodiment of the present invention, the adjustable light sensing system employed in automatically controlling the shutter speed by means of the network of FIGURE 1 and including the photoconductor 1, comprises a condenser lens 7 disposed in front of the photoconductor 1 and focused thereon and a shade or hood 6 surrounding the lens 7. The lens 7 advantageously has an angle of vision corresponding to that of the camera lens and is directed in the same direction so that the light focused through the lens 7 varies with that focused through the main camera lens.

Associated with the camera provided with the present control system are three contiguous successive rings 12$a$, 10, and 13$a$ respectively, the ring 10 being stationary and the rings 12$a$ and 13$a$ being independently rotatable. The ring 12$a$ is coupled to and movable with the camera main diaphragm and is provided with indicia 14 designating the main lens diaphragm opening. The ring 13$a$ is provided with indicia 15 corresponding to film speed or sensitivity ratings, for example, ASA ratings, and the ring 10 is provided with an indicator 11.

As seen in FIGURE 4, the light sensing system is eccentrically mounted within the rings 12$a$ and 13$a$ and the lens 7 and the photoconductor 1 are longitudinally positioned on opposite sides of the ring 10. A pair of variable light absorbing members 12 and 13 are carried by and rotatable with the rings 12$a$ and 13$a$ respectively. The light absorbing member 12 is of annular configuration and is provided in the border thereof with a plurality of peripherally spaced light filters 8, preferably neutral, of successively increasing light absorption.

The filters 8 are selectively movable into the light path between the lens 7 and photoconductor 1, with the adjustment of the main lens diaphragm. In the illustrated embodiment, the main lens diaphragm is provided with three stops, and three filters 8 are provided, the light transmittivity of the filters being related in the same proportion as the area of the main lens diaphragm opening, the filter 8 of greater light absorption registers with the sensing system when the smaller main lens diaphragm opening is employed.

The light absorbing member 13 is likewise of annular configuration and is provided with a plurality of peripherally spaced circular apertures 9 of successively greater area. The apertures 9 are selectively movable into coaxial registry with the optical axis of the lens 7 and are so spaced in relationship to the indicia 15, that with larger apertures 9 registering with the light sensing system, larger film speed numbers 15 register with the indicator 11. The areas of the apertures 9 are related in the same manner as the film speed indices or ratings 15. Thus, if the film sensitivity index is doubled, the area of the aperture 9 is doubled and the light incident on the photoconductor 1 is likewise doubled so that the shutter speed time is halved. Similarly, when the main lens diaphragm is stopped down, a higher-light absorbing filter 8 is brought into operation to reduce the light incident on the photoconductor 1 and to correspondingly increase the shutter open time. It can be seen from the above that the percentage of light transmitted through the elements 12 and 13 along the light sensing system is substantially equal to the product of the percentages of light transmission of the individual elements 12 and 13.

Figure 6:
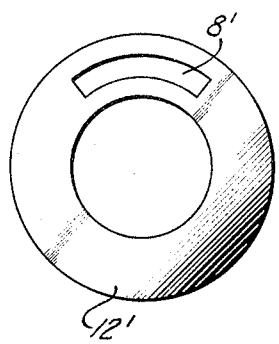
Figure 7:
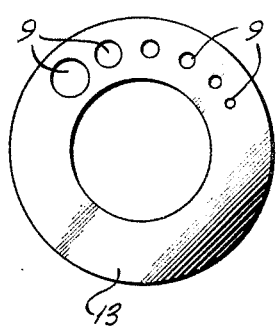
Figure 8:
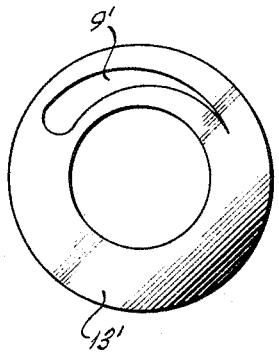

In FIGURES 6 and 8 of the drawings there are illustrated light absorbing elements 12′ and 13′ which may be substituted for the elements 12 and 13 respectively and differ from them only in that the light absorption may be varied continuously instead of in increments. Specifically, the light absorbing element 12′ has a peripheral slot formed therein in which is located an arcuately extending neutral light filter 8′ whose density increases along the length thereof. The light absorbing properties of successive sections of the filter 8′ varies in relationship to the openings of the main camera diaphragm in the manner of the filters 8 as previously described. The light absorbing element 13′ is in the shape of an annulus having a tapered opening 9' longitudinally formed in the wall thereof, the opening 9' being related to the speed sensitivity indicia 15 in the manner of the apertures 9.

The arrangement employing the elements 12' and 13' operates in the same manner as that employing the elements 12 and 13 as described above. It should be noted that the elements 12 and 12', as well as the elements 13 and 13' are interchangeable. Moreover, both light absorbing elements in the light sensing system may be of the filter type both either 12 or 12' or one 12 and the other 12'.

The embodiment of the present invention illustrated in FIGURES 9 to 13 of the drawings differs from those previously described primarily in the structure of the light filter carrying element. The light sensing system comprises a condenser lens 25, a photoconductor 21 and a pair of variable light absorbing members 26 and 27 associated in the manner of the corresponding components 7, 1, 12 and 13 above described. The light absorbing members are associated with rings 18, 19 and 20 related in the manner of the earlier embodiment and the light absorbing element 27 is of the structure of the light absorbing element 13, and is provided with a tapered aperture 17.

The light absorbing element 26 is of annular shape and has formed in the wall thereof an arcuately extending slot of uniform width. Registering with the arcuate slot and extending along the length thereof is a longitudinally tapered, wedge shaped, preferably neutral, light filter 16. The light filter 16 is formed of a material having a uniform and constant light transmittivity per unit thickness or length of transmission. The opposite front and rear faces of the filter 16 are flat and are at an angle to each other so that the thickness thereof varies uniformly and at a constant rate along its length.

The transmittivity T of a filter having thickness of $x$ and transmittivity per unit thickness $t$ is given by the relation:

$$T = t^x$$

From this relation it can be mathematically proven that in such a filter the transmittivity ratio of any two points with a constant pitch interval therebetween is constant. If such transmittivity ratio is $2^n$, the transmittivity ratio of any neighbouring two of points which divide the interval between the first mentioned two points into $n$ equal parts is 2 or ½. Accordingly, if the transmitivity and the gradient of the camera objective diaphragm coupled filter 16 are so selected that the ratio of the transmittivity of the point corresponding to F2 of the filter 16 to that of the point corresponding to F22 is $2^7 = 128$, then a switchover operation between two neighbouring ones of points which divide the interval between such F2 and F22 points into seven equal parts will double or halve the transmitted light amount.

In case of, for example counter-light photographing, the background is excessively bright relative to the object to be photographed so that there is a possibility of underexposure; and in the event that the background is of excessively poor illumination relative to the object to be photographed, there is a possibility of overexposure. In such cases adjustment of the exposure condition is necessary. Such adjustment is readily performed by making the camera objective diaphragm F number scale 20 and the camera objective diaphragm coupled filter 16 mutually displaceable and shifting the relative positions of the scale 20 and the filter 16 from the normal position to the necessary extent.

In practice such values as the real resistance value of the photoconductive element 1, the real capacitance value of the capacitor 2, etc. are slightly different from those indicated on them, respectively. Accordingly, on completing the assembling operation the necessary adjustment must be made in order to obtain proper exposure operation. It often happens that such adjustment cannot be carried out by the adjustment only of the trigger level of the switching circuit 3. In such cases the relative positions of the camera objective diaphragm coupled filter 16 and F number scale 20 may be shifted so as to correspond to the proper exposure position and accordingly to establish the normal photographing position. In this case the exposure condition adjustment as mentioned in the preceding paragraph may be carried out by shifting the camera objective diaphragm coupled filter 16 relative to this normal photographing position.

In a filter 16 such as described above, the direction of the light path slightly changes when the light rays have passed through the filter. If the arrangement is required to be so accurate that even such change has influence on it, a transparent plate 29 of the same gradient and refractive index as those of said filter 16 may be applied to the filter 6 so as to form two parallel surfaces and accordingly not to cause light path direction change.

As in the previously described embodiments, a light filter type or a different diaphragm type of light absorbing element may be substituted for the element 27. Moreover the positions of the elements 26 and 27 may be reversed.

While there have been described and illustrated preferred embodiments of the present invention, it is apparent that numerous alterations, omissions and additions may be made without departing from the spirit thereof.

What is claimed is:

1. An exposure timing camera comprising a photosensitive element, an automatic exposure mechanism automatically responsive to said photosensitive element, and a pair of independently adjustable variable light absorbing elements disposed in the path of light to the said photosensitive element, the percentage of light transmission of said pair of elements along said light path being related to the product of the percentages of the light transmission of the individual elements along said light path.

2. An automatic exposure camera comprising a photoconductor, a variable speed shutter mechanism responsive to the resistance of said photoconductor, a main camera lens adjustable opening diaphragm, and a pair of independently adjustable variable light absorbing elements disposed in tandem in the path of light to said photoconductor, the percentage of light transmission of said pair of elements along said light path being substantially equal to the product of the percentages of light transmission of the individual elements along said light path, one of said light absorbing elements being coupled to and concurrently adjustable with said main lens diaphragm.

3. An automatic exposure camera comprising a photoconductor, a variable speed shutter mechanism responsive to the resistance of said photoconductor, a main camera lens adjustable opening diaphragm, and a pair of independently adjustable variable light absorbing elements disposed in tandem in the path of light to said photoconductor, at least one of said light absorbing members being a variable density light filter member movable across the light path to said photoconductor and the percentage of light transmission of said pair of elements along said light path being substantially equal to the product of the percentages light transmission of the individual elements along said light, one of said light absorbing elements being coupled to and concurrently adjustable with said main lens diaphragm.

4. The automatic exposure camera of claim 3 wherein the other of said light absorbing elements comprises a variable aperture member movable across the light path to said photoconductor.

5. The automatic exposure camera of claim 3 wherein the other light absorbing member comprises a variable density light absorbing filter movable across said light path.

6. The automatic exposure camera of claim 3 including a condensor lens positioned forwardly of said filter elements in the path of light to said photoconductor.

7. The automatic exposure camera of claim 3 wherein said light absorbing elements comprises coaxially mounted parallel rotatable discs having peripheral borders intersecting the path of light to said photoconductor.

8. The automatic exposure camera of claim 3 wherein said light filter member comprises a wedge-shaped filter formed of a uniform light absorbing material and movable along the longitudinal axis thereof across said photoconductor light path whereby to bring filter sections of different thicknesses in registry with said light path.

9. The automatic exposure camera of claim 8 wherein said wedge-shaped filter increases uniformly in thickness along the length thereof.

References Cited

UNITED STATES PATENTS

| 2,278,338 | 3/1942 | Tonnies. |
| 3,194,136 | 7/1965 | Ort. |
| 3,205,799 | 9/1965 | Burgarella et al. |
| 3,286,609 | 11/1966 | Kobayashi et al. |

NORTON ANSHER, Primary Examiner

JOSEPH F. PETERS, JR., Assistant Examiner

U.S. Cl. X.R.

95—64